United States Patent [19]
Wace et al.

[11] 3,928,207
[45] Dec. 23, 1975

[54] APPARATUS FOR SEPARATING PARTICULATE SOLIDS FROM LIQUIDS

[75] Inventors: Peter Frederick Wace, Oxford; Claude Lewis Stockwell, Newbury; Peter James Alder, Abingdon, all of England

[73] Assignee: United Kingdom Atomic Energy Authority, London, England

[22] Filed: Apr. 4, 1974

[21] Appl. No.: 458,044

[30] Foreign Application Priority Data
Apr. 9, 1973 United Kingdom............... 17002/73

[52] U.S. Cl. ............... 210/252; 209/269; 209/315; 210/388
[51] Int. Cl............................................ B01d 35/20
[58] Field of Search ........... 210/259, 252, 260, 261, 210/262, 319, 388, 389; 209/269, 274, 311, 365, 382, 315

[56] References Cited
UNITED STATES PATENTS

| | | | |
|---|---|---|---|
| 697,353 | 4/1902 | McDermott ........................ | 209/269 |
| 2,293,978 | 8/1942 | Janssen ............................... | 209/269 |
| 2,505,513 | 4/1950 | Young et al. .................... | 210/388 X |
| 2,883,051 | 4/1959 | Maeder.............................. | 209/269 |
| 3,124,530 | 3/1964 | Jakobs .............................. | 210/389 |
| 3,135,690 | 6/1964 | Eder .................................. | 210/389 |
| 3,446,349 | 5/1969 | Benzan ............................. | 209/382 |
| 3,483,974 | 12/1969 | Pearsall........................... | 209/382 X |
| 3,813,298 | 5/1974 | Chwalek ........................ | 209/274 X |

FOREIGN PATENTS OR APPLICATIONS

499,442   3/1951   Belgium............................. 210/388

Primary Examiner—Theodore A. Granger
Attorney, Agent, or Firm—Larson, Taylor & Hinds

[57] ABSTRACT

Apparatus for the separation of particulate solids from a liquid and comprising a box, a chamber within the box, a first liquid draining screen dividing the chamber into upper and lower compartments, means for feeding a mixture of particulate solids and liquid on to one end of the first screen, a weir disposed at the other end of the first screen for allowing the controlled passage of the solids thereover, means for withdrawing liquid from the lower compartment of the chamber after passage through the screen and means for vibrating the box so as to cause movement of the solids along the screen and over the weir.

4 Claims, 2 Drawing Figures

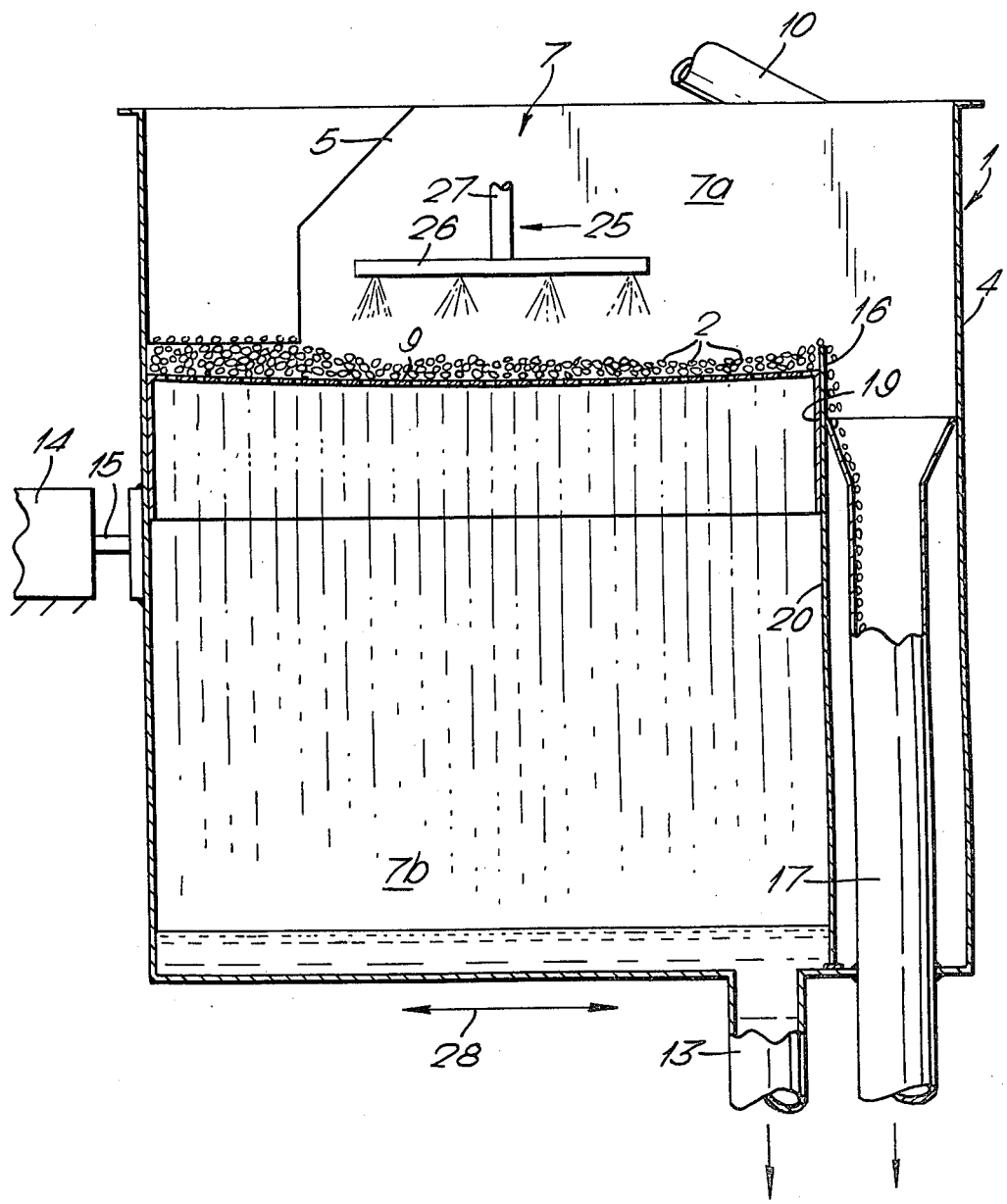

3,928,207

APPARATUS FOR SEPARATING PARTICULATE SOLIDS FROM LIQUIDS

BACKGROUND OF THE INVENTION

This invention relates to apparatus for separating particulate solids from liquids.

One method of manufacturing solid nuclear fuel particles comprises forming the particles by gel precipitation, using a solution of ammonia as the precipitating liquid. The fuel particles may then be fired but before this is done they are separated from the ammonia, washed and dried.

The present invention provides apparatus for separating the nuclear fuel particles from the ammonia solution, for washing the particles and for separating them from the washing medium.

SUMMARY OF THE INVENTION

According to the invention apparatus for the separation of particulate solids from a liquid comprises a box, a chamber within the box, a first liquid draining screen dividing the chamber into upper and lower compartments, means for feeding a mixture of particulate solids and liquid on to one end of the first screen, a weir disposed at the other end of the first screen for allowing the controlled passage of the solids thereover, means for withdrawing liquid from the lower compartment of the chamber after passage through the screen and means for vibrating the box so as to cause movement of the solids along the screen and over the weir.

The box is provided with a second chamber disposed alongside the first chamber and with a second, liquid draining screen dividing the second chamber into upper and lower compartments, the said weir being disposed between the first and second screen whereby the solids pass from the first screen to the second screen, means being provided for withdrawing liquid from the lower compartment of the second chamber.

Means may be provided for spraying a liquid on to the solids so as to wash them.

DESCRIPTION OF THE DRAWINGS

An embodiment of the invention will now be described by way of example with reference to the accompanying semidiagrammatic drawings, wherein:

FIGS. 1 and 2 are opposite side views in medial section.

DESCRIPTION OF A PREFERRED EMBODIMENT

Figure 1:
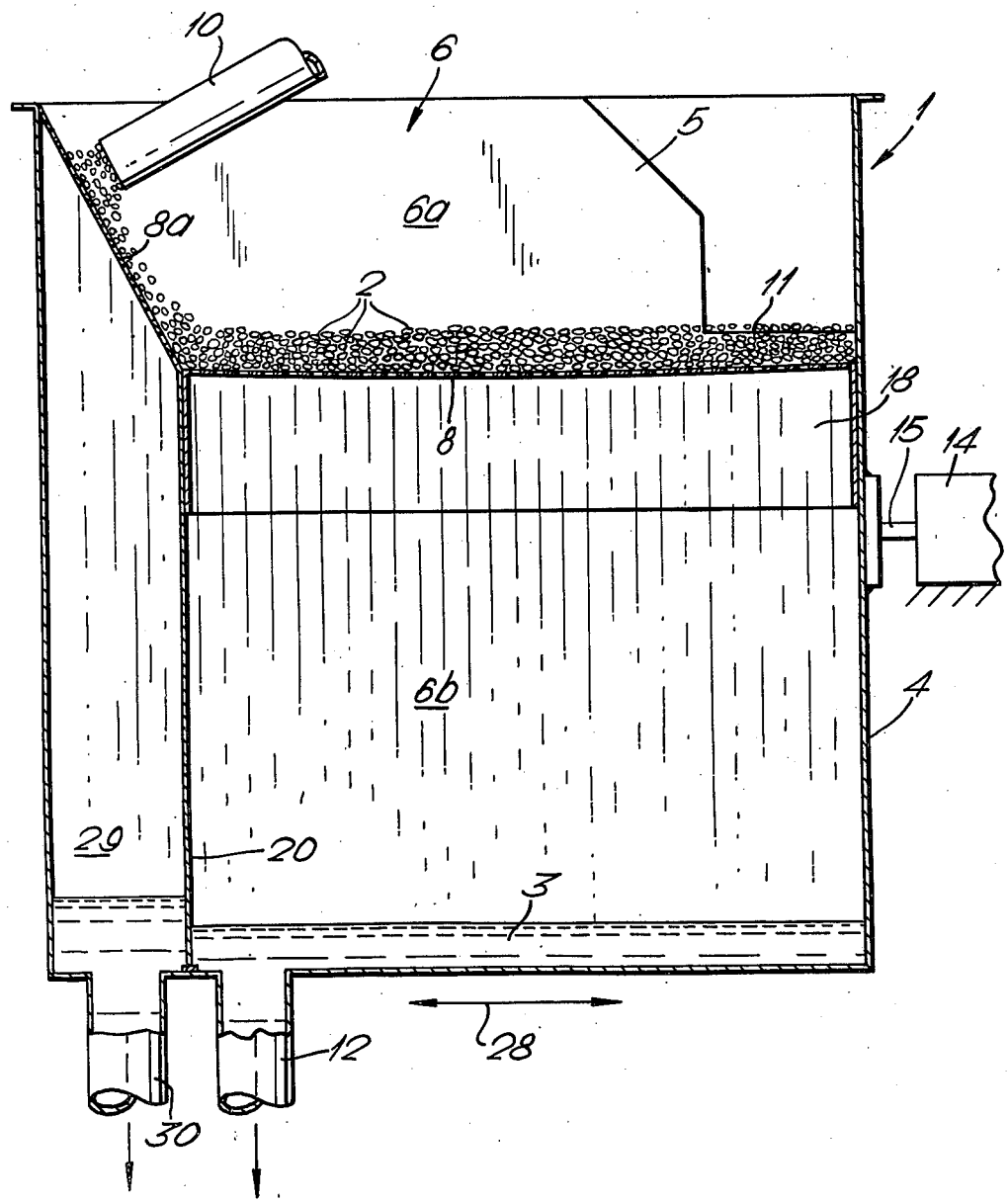

With reference to the drawings apparatus 1 for the separation of particulate solids 2 (nuclear fuel particles) of spheroidal form from a liquid 3 (ammonia) comprises a box 4 divided internally by an upright partition 5 into first and second chambers 6, 7, disposed side by side. A first, substantially level, liquid draining screen 8 divides the first chamber 6 into upper and lower compartments 6a, 6b. A second, substantially level, liquid draining screen 9 divides the second chamber 7 into upper and lower compartments 7a, 7b. Means comprising a supply duct 10 is provided to feed a mixture of the solids and liquids on to a third, downwardly sloping subsidiary screen 8a at one end of the screen 8. One end of the partition 5 is cut away to form a weir 11 disposed at the other end of the first screen 8 and between adjacent parts of the screens 8 and 9 for allowing the controlled passage of the solids 2 from the first chamber 6 to the second chamber 7. Means comprising outlets 12, 13 are provided for withdrawing liquid from the lower compartments 6b, 7b of the first and second chambers 6, 7. Means comprising an oscillator 14 connected to the box 4 by a rod 15 is provided to vibrate the box in a substantially horizontal plane so as to cause movement of the solids 2 along the first screen 8 (see FIG. 1), over the weir 11 and along the second screen 9 (see FIG. 2) to leave the box by way of a second weir 16 and an outlet 17.

In further detail, the particles 2 have been formed by gel precipitation using the liquid 3 as the precipitating liquid. The weir 11 projects a little above the screen 9. The weirs 11, 16 allow passage of the particles 2 but restrict passage of liquid therewith. The screens 8, 9, are of wire mesh, the mesh allowing free drainage of liquid without passage of the solids 2 therethrough. The screens 8, 9, have concave upper surfaces to assist drainage and are mounted on box-like supports 18, 19 which are a push fit between the walls of the box 4, the partition 5 and second partition 20.

As shown in FIG. 2, the apparatus 1 is provided with means 25 for spraying water on to the solids 2 whilst they pass along the screen 9, so as to wash them. The means 25 comprises a sprayer head 26 supplied with washing water by way of a duct 27.

In operation, a mixture of solids 2 and liquid 3 is discharged by the supply duct 10 on to the downwardly sloping screen 8a as the box 4 is vibrated backwards and forwards, as indicated by the arrow 28.

As the solids 2 slide down the screen 8a assisted by the vibrations applied to the box 4, most of the liquid 3 drains through the screen into a compartment 29 beneath to leave the compartment by way of an outlet 30.

Vibration of the box 4 also causes slow agitational movement of the spheroidal particles 2 along the substantially level screen 8 to "flow" over the weir 11 in the manner of a fluid and on to the screen 9. Meanwhile liquid 3 continues to drain through the mesh holes of the screen 8. Once on the screen 9, the particles 2 move along this screen, in counter-direction to the particles 2 on the screen 8. Eventually, the moving particles 2 traverse the second weir 16 in a fluid-like manner to leave the box 4 by way of the outlet 17. They are washed with water beforehand however, by the sprayer means 25. The mixture of liquid 3 and washing water collected in the lower compartment 7b after draining through the screen 9 leaves the compartment by way of the outlet 13.

The invention may also be used to separate the nuclear fuel particles 2 from process liquids other than ammonia, for example, water or a solvent.

We claim:

1. Apparatus for the separation of particulate solids from a liquid, the apparatus comprising a box, a longitudinally extending vertical partition within the box providing first and second chambers side by side within the box, first and second liquid draining screens dividing the first and second chambers respectively into upper and lower compartments, said screens having longitudinally spaced entry and exit ends adjacent the ends of said vertical partition, said screens being laterally disposed such that the entry end of the first screen is laterally adjacent the exit end of the second screen but separated therefrom by said vertical partition, means for feeding a mixture of particulate solids and liquid onto the entry end of the first screen for movement to the exit end, a first weir formed by a part of the vertical partition of reduced height disposed at the exit end of the first screen and projecting above the first screen for allowing the controlled passage of the solids transversely thereover from the exit end of the first screen onto the entry end of the second screen, a second weir disposed at the exit end of, and projecting above, the second screen for allowing controlled passage of the solids thereover, means for withdrawing liquid from the lower compartments of the chambers after passage through the screens, means for vibrating the box so as to cause generally longitudinal movement of solids along the first screen to the exit end thereof and then transversely over the first weir, along the second screen and over the second weir, and outlet means for the solids which pass over the second weir.

2. Apparatus as claimed in claim 1 for the separation of particulate solids from a liquid wherein means are provided for spraying a liquid on to solids on the second draining screen.

3. Apparatus as claimed in claim 1 for the separation of particulate solids from a liquid wherein the means for feeding a mixture of particulate solids and liquid on to one end of the first draining screen includes a subsidiary downwardly sloping draining screen.

4. Apparatus as claimed in claim 1 for the separation of particulate solids from a liquid wherein at least the first draining screen has a concave upper surface to assist drainage, and both screens are substantially horizontally disposed.

* * * * *